(12) United States Patent
Ji et al.

(10) Patent No.: US 12,722,340 B2
(45) Date of Patent: Sep. 1, 2026

(54) ANTI-CORROSION AUTOMATIC WRAPPING DEVICE AND METHOD FOR BEND PIPE WITH POLYETHYLENE COMPOSITE TAPE

(71) Applicant: Hebei Hengtong Pipe Fittings Group Co., Ltd, Cangzhou (CN)

(72) Inventors: Yanqing Ji, Cangzhou (CN); Lianxin Han, Cangzhou (CN); Liang Wang, Cangzhou (CN); Zhipeng Han, Cangzhou (CN); Mengfei Ji, Cangzhou (CN); Xunliang Shi, Cangzhou (CN)

(73) Assignee: Hebei Hengtong Pipe Fittings Group Co., Ltd, Cangzhou (CN)

( * ) Notice: Subject to any disclaimer, the term of this patent is extended or adjusted under 35 U.S.C. 154(b) by 264 days.

(21) Appl. No.: 18/629,891

(22) Filed: Apr. 8, 2024

(65) Prior Publication Data

US 2025/0222649 A1 Jul. 10, 2025

(30) Foreign Application Priority Data

Jan. 9, 2024 (CN) ........................ 202410026831.X

(51) Int. Cl.

*B29C 63/06* (2006.01)
*B29L 23/00* (2006.01)
*F16L 58/10* (2006.01)

(52) U.S. Cl.
CPC ........ *B29C 63/065* (2013.01); *F16L 58/1063* (2013.01); *B29L 2023/004* (2013.01)

(58) Field of Classification Search
CPC ................. B29C 63/06; B29C 63/065; B29C 63/08–145; F16L 58/1063; B29L 2023/004
See application file for complete search history.

(56) References Cited

FOREIGN PATENT DOCUMENTS

| CN | 114654712 A | 6/2022 |
|---|---|---|
| CN | 217664084 U | 10/2022 |
| CN | 115447120 A | 12/2022 |

*Primary Examiner* — Carson Gross
(74) *Attorney, Agent, or Firm* — JEEN IP LAW, LLC

(57) ABSTRACT

The present disclosure provides an anti-corrosion automatic wrapping device and method for a bend pipe with a polyethylene composite tape, including a wrapping machine, a plurality of sets of bend pipe conveying structures, a fixed base, a rotating ring, a sliding block, a first arc-shaped pipe, a connecting shaft, and a blocking member. The blocking member is disposed on a same side of the sliding block as the first arc-shaped pipe and connected to the sliding block, wherein when the sliding block slides into the bend pipe, the blocking member is configured to abut against an end face of one end of the bend pipe When the bend pipe supported by the plurality of sets of bend pipe conveying structures is conveyed through the wrapping machine, the bend pipe can push the blocking member to move.

10 Claims, 20 Drawing Sheets

ANTI-CORROSION AUTOMATIC WRAPPING DEVICE AND METHOD FOR BEND PIPE WITH POLYETHYLENE COMPOSITE TAPE

CROSS-REFERENCE TO RELATED APPLICATIONS

This application is based upon and claims priority to Chinese Patent Application No. 202410026831.X filed on Jan. 9, 2024, the entire contents of which are incorporated herein by reference.

TECHNICAL FIELD

The present disclosure belongs to the technical field of anti-corrosion wrapping for bend pipes, and in more particular, relates to an anti-corrosion automatic wrapping device and method for a bend pipe with a polyethylene composite tape.

BACKGROUND

Wrapping a bend pipe with a polyethylene composite tape is to form an anti-corrosion layer, thus to extend the service life of the bend pipe. The process of wrapping the bend pipe includes medium frequency heating, spraying epoxy powder, wrapping machine to wrap the bend pipe with a polyethylene composite tape, cooling, among others.

An anti-corrosion automatic wrapping device for bend pipe polyethylene composite belts includes a wrapping machine and a plurality of sets of bend pipe conveying structures. The plurality of sets of bend pipe conveying structures are arranged in an annular shape. The plurality of sets of bend pipe conveying structures are configured to support and convey a bend pipe to move along an arc line coaxial with the bend pipe, with a wrapping machine disposed between two adjacent sets of bend pipes.

In the process of conveying the bend pipes by the plurality of sets of bend pipe conveying structures, due to lack of position limits, the bend pipes are prone to shaking or deviations in their running trajectories, which will affect the qualities of the polyethylene composite tapes wrapped around the bend pipes.

SUMMARY

The objective of the present disclosure is to provide anti-corrosion automatic wrapping device and method for a bend pipe with a polyethylene composite tape, aiming to solve the problem that during the process of conveying the bend pipe by the plurality of sets of bend pipe conveying structures, the bend pipe is prone to shaking or deviation in its running trajectory.

In a first aspect, an embodiment of the present disclosure provides an anti-corrosion automatic wrapping device for a bend pipe with a polyethylene composite tape including a wrapping machine and a plurality of sets of bend pipe conveying structures, the device further including: a fixed base, a rotating ring, a sliding block, a first arc-shaped pipe, a connecting shaft, and a blocking member. The fixed base is fixed on a ground, the fixed base has a vertically arranged limiting shaft, a side wall of the limiting shaft has two outwardly protruding positioning portions, the two positioning portions are arranged at an interval along a vertical direction, the plurality of sets of bend pipe conveying structures are arranged in an annular shape around the limiting shaft, and the wrapping machine is disposed between adjacent two of the bend pipe conveying structures. The rotating ring is rotatably sleeved on the limiting shaft and disposed between the two positioning portions. The sliding block is configured to slidably pass through inside of a bend pipe supported by the plurality of sets of bend pipe conveying structures. The first arc-shaped pipe is coaxially arranged with the limiting shaft and has one end fixedly connected to the sliding block. The connecting shaft has one end connected to the first arc-shaped pipe, and the other end fixedly connected to the rotating ring. The blocking member is disposed on a same side of the sliding block as the first arc-shaped pipe and connected to the sliding block, when the sliding block slides into the bend pipe, the blocking member is configured to abut against an end face of one end of the bend pipe. Wherein when the bend pipe supported by the plurality of sets of bend pipe conveying structures is conveyed through the wrapping machine, the bend pipe can push the blocking member to move.

Compared with the existing technology, in the solution shown in the embodiment of the present application, the bend pipe is placed on a plurality of sets of bend pipe conveying structures and coaxial with the limiting shaft. The plurality of sets of bend pipe conveying structures are configured to convey the bend pipe to move along an arc coaxial with the bend pipe, to drive the connecting shaft rotates with the rotating ring until the sliding block slides into the bend pipe and the blocking member abuts against the end face of the front end of the bend pipe along the movement direction. Then, the plurality of sets of bend pipe conveying structures convey the bend pipes supported thereby through the wrapping machine. Since the bend pipe can push the blocking member, the sliding block will move along an arc line with the bend pipe and the moving arc line is coaxial with the limiting shaft. During this process, the sliding block can limit the bend pipe to prevent the bend pipe from shaking or deviation in the running trajectory, and avoids the problem that during the process of conveying the bend pipe by the plurality of sets of bend pipe conveying structures, the bend pipe is prone to shaking or deviation in its running trajectory.

Combining the first aspect, in a possible implementation, a side wall of one end of the first arc-shaped pipe used to be fixed to the sliding block is provided with a plurality of air outlet holes, and the other end of the first arc-shaped pipe is closed, the anti-corrosion automatic wrapping device of a bend pipe with a polyethylene composite tape further includes: an air intake pipe and a blower. The air intake pipe is connected to the first arc-shaped pipe and has one end communicated with inside of the first arc-shaped pipe. An air outlet of the blower is communicated with the other end of the air inlet pipe through a hose.

Combining the first aspect, in a possible implementation, the blocking member abuts against a top of the bend pipe, and the anti-corrosion automatic wrapping device for a bend pipe with a polyethylene composite tape further includes: a connecting member, a connecting plate, a ring-shaped member, and a locking shaft. The connecting member is slidably connected and sleeved in the vertical direction outside the blocking member and fixedly connected to the sliding block. The connecting plate is disposed on a same side of the sliding block as the first arc-shaped pipe and above the connecting member, the connecting plate has an arc-shaped portion of an arc-shaped structure and coaxially arranged with the limiting shaft, the arc-shaped portion has one end fixedly connected to the sliding block, and the other end having a locking portion protruding outward along a radial direction of the arc-shaped portion. The ring-shaped member is sleeved outside the plurality of sets of bend pipe conveying structures and coaxially arranged with the limiting shaft, the ring-shaped member is disposed below the connecting plate, and a locking hole is provided on an upper surface of the ring-shaped member. The locking shaft is arranged vertically and fixed on the lower surface of the locking portion, and the locking shaft abuts against the upper surface of the ring-shaped member. When the wrapped bend pipe continues to move forward, the locking shaft can be coaxially aligned with the locking hole and slide into the locking hole, so that the blocking member can avoid an end face of the bend pipe, thereby enabling the blocking member and the arc-shaped portion to pass into the moving bend pipe.

Combining the first aspect, in a possible implementation, a first arc-shaped cavity coaxial with the ring-shaped member is provided inside the ring-shaped member, and the first arc-shaped cavity is communicated with the locking hole, the anti-corrosion automatic wrapping device for a bend pipe with a polyethylene composite tape further includes a first connecting pipe. The first connecting pipe has one end fixed on an outer wall of the ring-shaped member and communicated with the first arc-shaped cavity, and the other end connected to an air inlet of the blower.

Combining the first aspect, in a possible implementation, the ring-shaped member is provided therein with a second arc-shaped cavity coaxial with the ring-shaped member, and a top surface of the ring-shaped member is provided with a ventilation hole communicated with the first arc-shaped cavity, and the anti-corrosion automatic wrapping device for a bend pipe with a polyethylene composite tape further includes: a second connecting pipe, a second arc-shaped pipe, a sealing gasket, a fixed plate, a drive shaft, a cold air outlet pipe, a cold air inlet pipe, and two sets of ejection assemblies. The second connecting pipe has one end fixed on the ring-shaped member and communicated with the second arc-shaped cavity, and the other end used to communicate with a water cooler. The second arc-shaped pipe is coaxially inserted into the second arc-shaped cavity, and both ends of the second arc-shaped pipe are closed. The sealing gasket is disposed inside the first arc-shaped cavity and adhered to a top wall of the first arc-shaped cavity, the gasket covers the ventilation hole. The fixed plate is disposed inside the first arc-shaped cavity and below the sealing gasket, the fixed plate is adhered and fixed to the sealing gasket. The drive shaft arranged vertically and slides through the top wall of the first arc-shaped cavity and the sealing gasket, the drive shaft is fixedly connected to the fixed plate, and the drive shaft is disposed below the connecting plate. The cold air outlet pipe has one end fixed on the ring-shaped member and connected and communicated with the ventilation hole, a middle portion of the cold air outlet pipe penetrating a top wall of the second arc-shaped cavity, and the other end of the cold air outlet pipe fixed on the second arc-shaped pipe and communicated with inside of the second arc-shaped pipe. The cold air inlet pipe has a middle portion penetrating an outer wall of the second arc-shaped cavity, one end of the cold air inlet pipe disposed inside the second arc-shaped cavity is fixedly connected to the second arc-shaped pipe and communicated with inside of the second arc-shaped pipe. The two sets of ejection assemblies are disposed in the first arc-shaped cavity and below the fixed plate. The ejection assembly includes an ejection shaft, a fixed pipe and a compression spring, the ejection shaft is arranged vertically and fixedly connected to the fixed plate, the fixed pipe is slidably connected and sleeved on the ejection shaft and fixedly disposed on a bottom wall of the first arc-shaped cavity, the compression spring is sleeved on the ejection shaft, both ends of the compression spring abut respectively against the fixed plate and a top surface of the fixed pipe. Wherein when the locking shaft is coaxially aligned with the locking hole, the locking portion abuts against an upper surface of the drive shaft.

Combining the first aspect, in a possible implementation, the anti-corrosion automatic wrapping device for a bend pipe with a polyethylene composite tape further includes a plurality of sets of sprinkler assemblies, and the sprinkler assembly includes a sprinkler pipe. The sprinkler pipe has one end fixed on an outer wall of the second arc-shaped cavity and communicated with the second arc-shaped cavity, and the other end disposed directly above the wrapped bend pipe and having an opening facing downward. A sprinkler pump is disposed on the sprinkler pipe. A sprinkler head disposed on the other end of the sprinkler pipe.

Combining the first aspect, in a possible implementation, the anti-corrosion automatic wrapping device for a bend pipe with a polyethylene composite tape further includes a plurality of guide pipes. The plurality of guide pipes are in one-to-one correspondence with the plurality of sets of bend pipe conveying structures and disposed between the ring-shaped member and the limiting shaft. The guide pipes are arranged along a radial direction of the limiting shaft, one end of the guide pipe is fixedly connected to the ring-shaped member and slides through the corresponding bend pipe conveying structure, an outer wall of the guide pipe is provided with a first external thread, and the first external thread is threadedly connected to two limit nuts, the two limiting nuts abut against the corresponding bend pipe conveying structure from both sides.

Combining the first aspect, in a possible implementation, wherein part of the guide pipe is communicated with the second arc-shaped cavity, and a one-way valve is provided at one end of the guide pipe communicated with the second arc-shaped cavity away from the ring-shaped member.

Combining the first aspect, in a possible implementation, the connecting shaft is arranged along a radial direction of the limiting shaft and is provided with a second external thread, and the connecting plate is disposed above the first arc-shaped pipe, the air inlet pipe is arranged vertically, the air inlet pipe includes a first section with a smaller outer diameter and a second section with a larger outer diameter, the first section is disposed below the second section, an outer side wall of the second section has an outwardly protruding abutment portion, the anti-corrosion automatic wrapping device for a bend pipe with a polyethylene composite tape further includes: a sliding connection sleeve, a drive sleeve, and an L-shaped plate. The sliding connection sleeve is slidably sleeved on the first arc-shaped pipe and fixedly connected to the connecting shaft, a top of the sliding connection sleeve has a protruding portion protruding upward, there is a gap between the protruding portion and the connecting plate, a top surface of the protrusion is provided with a stepped hole having a vertical axis line, the first portion with a larger diameter of the stepped hole is disposed above the second portion with a smaller diameter, the first section slidably extends inside the second portion and slides through a top of the first arc-shaped pipe, the second section slides through the locking portion and a lower end of the second section slidably extends inside the first portion, and the abutment portion abuts against an upper surface of the locking portion. The drive sleeve is sleeved on outside of the connecting shaft and provided with an internal thread threadedly connected to the second external thread, and an outer side wall of the drive sleeve is provided with an annular groove coaxially arranged with the internal thread. The L-shaped plate includes a vertically arranged vertical portion and a horizontally arranged horizontal portion, the vertical portion being rotatably sleeved inside the annular groove, and the horizontal portion abuts against an upper surface of the abutment portion.

In a second aspect, an embodiment of the present disclosure provides an anti-corrosion automatic wrapping method for a bend pipe with a polyethylene composite tape, employing the anti-corrosion automatic wrapping device for a bend pipe with a polyethylene composite tape according to claim 1, the method including steps of:

A. placing a bend pipe on the plurality of sets of bend pipe conveying structures, and making the bend pipe and the limiting shaft coaxial;

B. driving the connecting shaft to rotate with the rotating ring until the sliding block slides into the bend pipe and the blocking member abuts against an end face of a front end of the bend pipe along a movement direction;

C. conveying, by the plurality of sets of bend pipe conveying structures, the bend pipe through the wrapping machine.

Compared with the existing technology, in the solution shown in the embodiment of the present application, since the above-mentioned anti-corrosion automatic wrapping device for a bend pipe with a polyethylene composite tape is employed, it can avoid the problem that during the process of conveying the bend pipe by the plurality of sets of bend pipe conveying structures, the bend pipe is prone to shaking or deviation in its running trajectory.

BRIEF DESCRIPTION OF DRAWINGS

In order to more clearly illustrate the technical solutions in the embodiments of the present disclosure, the drawings needed to be used in the description of the embodiments or prior art will be briefly introduced below. Apparently, the drawings in the following description are only for the purpose of the present disclosure. For some embodiments, for those of ordinary skill in the art, other drawings can be obtained based on these drawings without exerting creative efforts.

Figure 1:
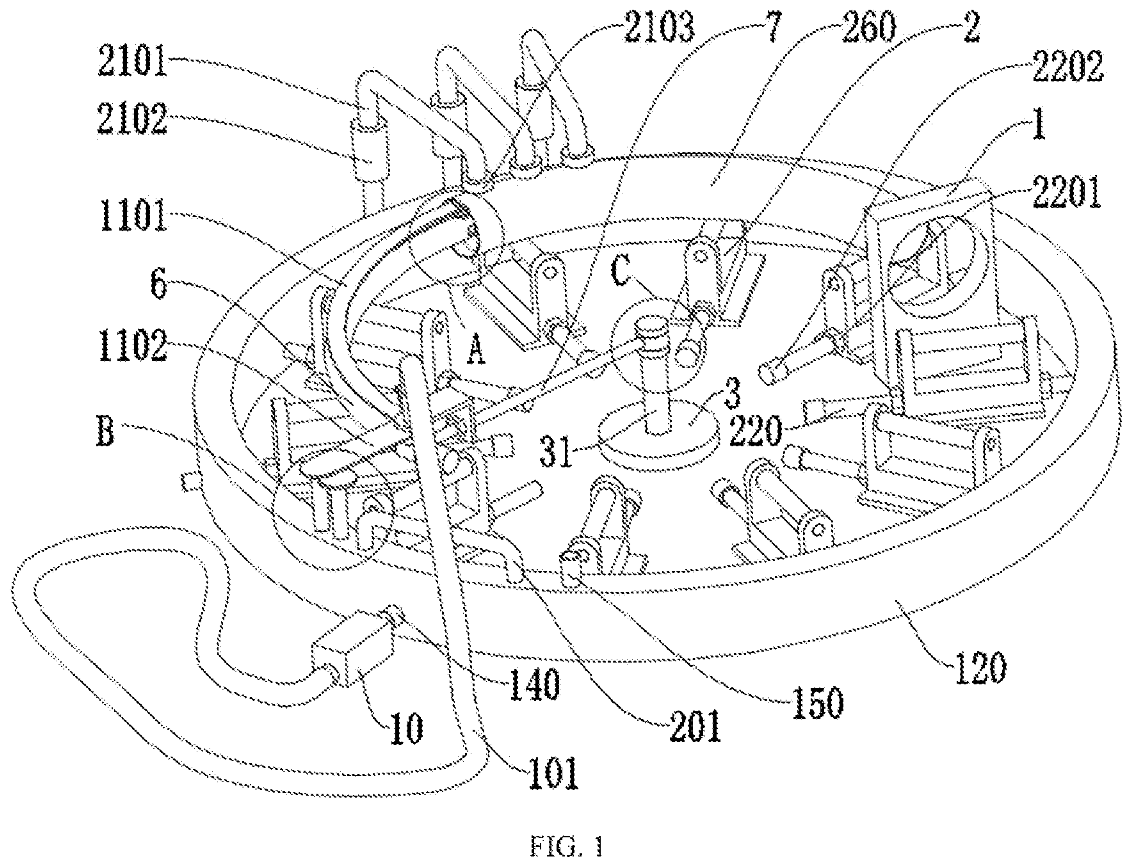
FIG. 1 is a first axonometric structural diagram of an anti-corrosion automatic wrapping device for a bend pipe with a polyethylene composite tape according to an embodiment of the present disclosure.
Figure 2:
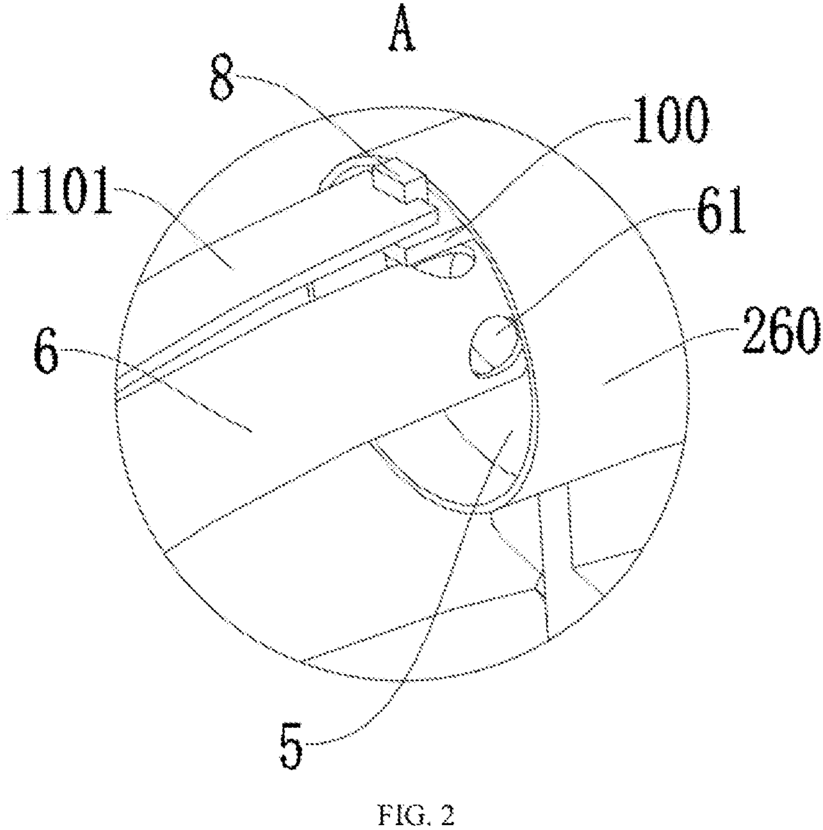
FIG. 2 is an enlarged structural diagram of part A in FIG. 1.
Figure 3:
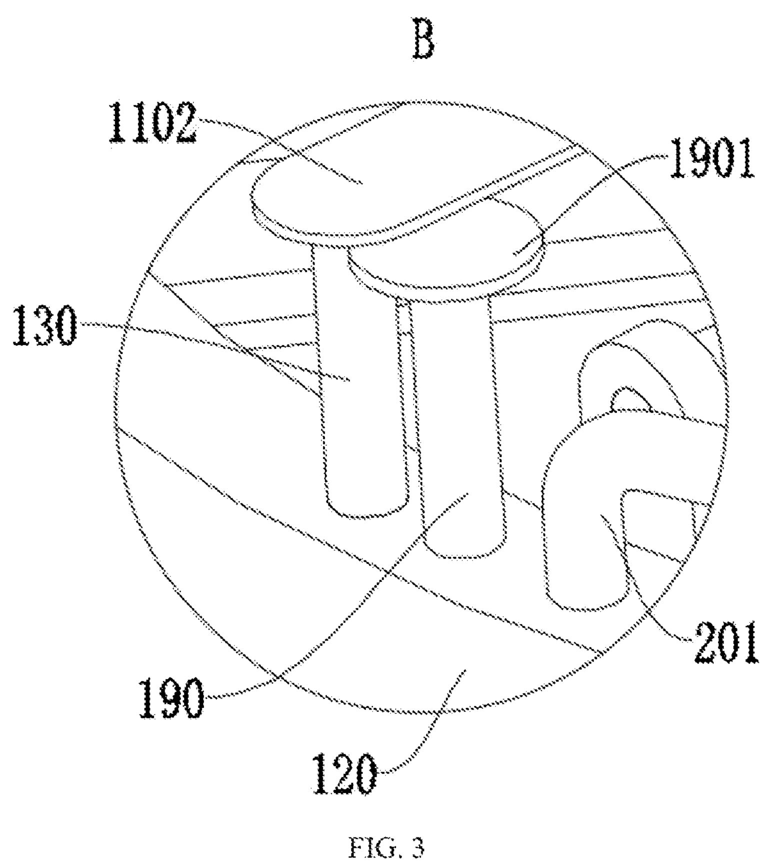
FIG. 3 is an enlarged structural diagram of part B in FIG. 1.
Figure 4:
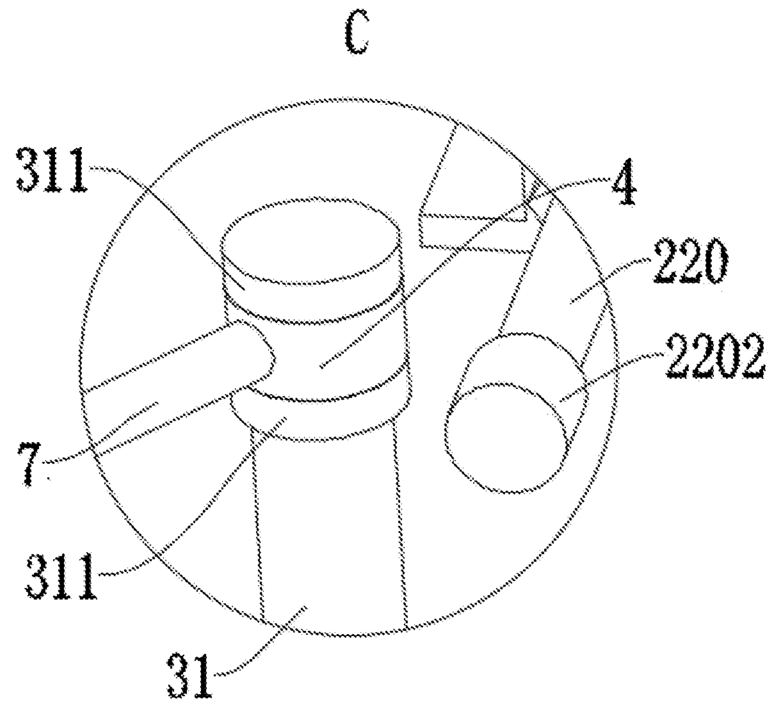
FIG. 4 is an enlarged structural diagram of part C in FIG. 1.

Reference numerals: 1. Wrapping machine; 2. Bend pipe conveying structure; 3. Fixed base; 31. Limiting shaft; 311. Positioning portion; 4. Rotating ring; 5. Sliding block; 6. First arc-shape pipe; 61. Air outlet hole; 7. Connecting shaft; 8. Blocking member; 9. Air Intake pipe; 91. First section; 92. Second section; 921. Abutment portion; 10. Blower; 101. Hose; 100. Connecting member; 110. Connecting plate; 1101. Arc-shaped portion; 1102. Locking portion; 120. Ring-shaped member; 1201. Locking hole; 1202. First arc-shaped cavity; 1203. Second arc-shaped cavity; 1204. Ventilation hole; 130. Locking shaft; 140. First connecting pipe; 150. Second connecting pipe; 160. Second arc-shaped pipe; 170. Sealing gasket; 180. Fixed plate; 190. Drive shaft; 1901. Blocking portion; 201. Cold air outlet pipe; 202. Cold air inlet pipe; 2001. Ejection shaft; 2002. Fixed pipe; 2003. Compression spring; 2101. Sprinkler pipe; 2102. Sprinkler pump; 2103. Sprinkler head; 220. Guide pipe; 2201. Limit nut; 2202. One-way valve; 230. Sliding connection sleeve; 2301. Protruding portion; 2302. Stepped hole; 23021. First portion; 23022. Second portion; 240. Drive sleeve; 2401. Annular groove; 250. L-shaped plate; 2501. Vertical portion; 2502. Horizontal portion; 260. Bend pipe.

DETAILED DESCRIPTION OF THE EMBODIMENTS

In order to make the technical problems, technical solutions and beneficial effects to be solved by the present disclosure clearer, the present disclosure will be further described in detail below with reference to the accompanying drawings and embodiments. It should be understood that the specific embodiments described here are only used to explain the present disclosure and are not used to limit the present disclosure.

It should be further noted that when an element is referred to as being "fixed on" or "disposed on" another element, it can be directly on the other element or indirectly on the other element. When an element is referred to as being "connected to" another element, it can be directly connected to the other element or indirectly connected to the other element.

Referring to FIG. 1, FIG. 2, FIG. 4, FIG. 5, FIG. 6 and FIG. 17 together, an anti-corrosion automatic wrapping device for a bend pipe with a polyethylene composite tape provided by the present disclosure will be described. The anti-corrosion automatic wrapping device for a bend pipe with a polyethylene composite tape includes a wrapping machine 1 and a plurality of sets of bend pipe conveying structures 2, and also includes a fixed base 3, a rotating ring 4, a sliding block 5, a first arc-shape pipe 6, and a connecting shaft 7 and a blocking member 8. The fixed base 3 is fixed on the ground. The fixed base 3 has a vertically arranged limiting shaft 31. The side wall of the limiting shaft 31 has two outwardly protruding positioning portions 311. The two positioning portions 311 are arranged at an interval along the vertical direction. The plurality of sets of bend pipe conveying structures 2 are arranged in an annular shape around the limiting shaft 31. The wrapping machine 1 is disposed between adjacent two of the bend pipe conveying structures 2. The rotating ring 4 is rotatably sleeved on the limiting shaft 31 and disposed between the two positioning portions 311. The sliding block 5 is configured to slidably pass through the inside of a bend pipe 260 supported by the plurality of sets of bend pipe conveying structures 2. The first arc-shaped pipe 6 is coaxially arranged with the limiting shaft 31 and has one end fixedly connected to the sliding block 5. The connecting shaft 7 has one end connected to the first arc-shaped pipe 6, and the other end fixedly connected to the rotating ring 4. The blocking member 8 is disposed on the same side of the sliding block 5 as the first arc-shaped pipe 6 and is connected to the sliding block 5. When the sliding block 5 slides into the bend pipe 260, the blocking member 8 is configured to abut against the end face of one end of the bend pipe 260. Here, when the bend pipe 260 supported by the plurality of sets of bend pipe conveying structures 2 is conveyed through the wrapping machine 1, the bend pipe 260 can push the blocking member 8 to move.

Compared with the existing technology, in the anti-corrosion automatic wrapping device for a bend pipe with a polyethylene composite tape provided by the present disclosure, the bend pipe 260 is placed on a plurality of sets of bend pipe conveying structures 2 and coaxial with the limiting shaft 31. The plurality of sets of bend pipe conveying structures 2 are configured to convey the bend pipe 260 to move along an arc coaxial with the bend pipe 260, to drive the connecting shaft 7 rotates with the rotating ring 4 until the sliding block 5 slides into the bend pipe 260 and the blocking member 8 abuts against the end face of the front end of the bend pipe 260 along the movement direction. Then, the plurality of sets of bend pipe conveying structures 2 convey the bend pipes 260 supported thereby through the wrapping machine 1. Since the bend pipe 260 can push the blocking member 8, the sliding block 5 will move along an arc line with the bend pipe 260 and the moving arc line is coaxial with the limiting shaft 31. During this process, the sliding block 5 can limit the bend pipe 260 to prevent the bend pipe 260 from shaking or deviation in the running trajectory, and avoids the problem that during the process of conveying the bend pipe 260 by the plurality of sets of bend pipe conveying structures 2, the bend pipe 260 is prone to shaking or deviation in its running trajectory.

In this embodiment, the two positioning portions 311 can limit the up and down movement of the rotating ring 4.

In some embodiments, referring to FIGS. 1, 2, 5, 7 and 17, the side wall of one end of the first arc-shaped pipe 6 used to be fixed to the sliding block 5 is provided with a plurality of air outlet holes 61, and the other end of the arc-shaped pipe 6 is closed. The anti-corrosion automatic wrapping device for a bend pipe with a polyethylene composite tape also includes an air inlet pipe 9 and a blower 10. The air inlet pipe 9 is connected to the first arc-shaped pipe 6 and has one end communicated with the inside of the first arc-shaped pipe 6. The air outlet of the blower 10 is communicated with the other end of the air inlet pipe 9 through a hose 101. Since the bend pipe 260 needs to be cooled after being wrapped with the polyethylene composite tape, the blower 10 can blow air into the first arc-shaped pipe 6 through the air inlet pipe 9, and the airflow flows into the bend pipe 260 from the plurality of air outlet holes 61. When the airflow flows out from the bend pipe 260, the heat on the bend pipe 260 can be taken away, thereby realizing the cooling function.

In this embodiment, the blower 10 may be a Roots blower or other suitable blower.

In some embodiments, referring to FIGS. 1, 2, 3, 5, 6, 8, 11 and 18, the blocking member 8 abuts against the top of the bend pipe 260, and the anti-corrosion automatic wrapping device for a bend pipe with a polyethylene composite tape also includes a connecting member 100, a connecting plate 110, a ring-shaped member 120 and a locking shaft 130. The connecting member 100 is slidably connected and sleeved along the vertical direction outside the blocking member 8 and is fixedly connected to the sliding block 5. The connecting plate 110 is disposed on the same side of the sliding block 5 as the first arc-shaped pipe 6 and above the connecting member 100, the connecting plate 110 has an arc-shaped portion 1101 of an arc-shaped structure and coaxially arranged with the limiting shaft 31. The arc-shaped portion 1101 has one end fixedly connected to the sliding block 5, and the other end having a locking portion 1102 protruding outward along the radial direction of the arc-shaped portion 1101. The ring-shaped member 120 is sleeved outside the plurality of sets of bend pipe conveying structures 2 and is coaxially arranged with the limiting shaft 31. The ring-shaped member 120 is disposed below the connecting plate 110. The upper surface of the ring-shaped member 120 is provided with a locking hole 1201. The locking shaft 130 is arranged vertically and fixed on the lower surface of the locking portion 1102, and the locking shaft 130 abuts against the upper surface of the ring-shaped member 120. When the wrapped bend pipe 260 continues to move forward, the locking shaft 130 can be coaxially aligned with the locking hole 1201 and slide into the locking hole 1201, so that the blocking member 8 can avoid the end surface of the bend pipe 260. Thus, the blocking member 8 and the arc-shaped portion 1101 can pass into the moving bend pipe 260. The blocking member 8 is slidably connected to the sliding block 5 in the vertical direction through the connecting member 100, and the ring-shaped member 120 can limit the downward movement of the blocking member 8 through the locking shaft 130 and the connecting plate 110. The bend pipe 260 pushes the blocking member 8 to move forward. When wrapping the bend pipe 260 with the polyethylene composite tape is completed, the plurality of sets of bend pipe conveying structures 2 continue to convey the bend pipe 260 to move forward. When the locking shaft 130 is aligned with the locking hole 1201, under the action of gravity, the locking shaft 130, the connecting plate 110 and the blocking member 8 move downward, and the locking shaft 130 slides into the locking hole 1201. When the connecting plate 110 abuts against the connecting member 100, the blocking member 8 avoids the end surface of the bend pipe 260, and by limiting the locking shaft 130 through the ring-shaped member 120, it is possible to restrict the connecting plate 110, the locking shaft 130, the first arc-shaped pipe 6, the connecting member 100, and the sliding block 5 from continuing to move with the bend pipe 260, and the blocking member 8 and the arc-shaped portion 1101 can pass into the moving bend pipe 260. As the sliding block 5 and the first arc-shaped pipe 6 gradually pass into the bend pipe 260, the air flow from the air outlet hole 61 can gradually cool down the bend pipe 260 from the front end to the rear end, so that the bend pipe 260 can be cooled evenly.

In this embodiment, the ring-shaped member 120 is fixedly connected to the ground.

Figure 11:
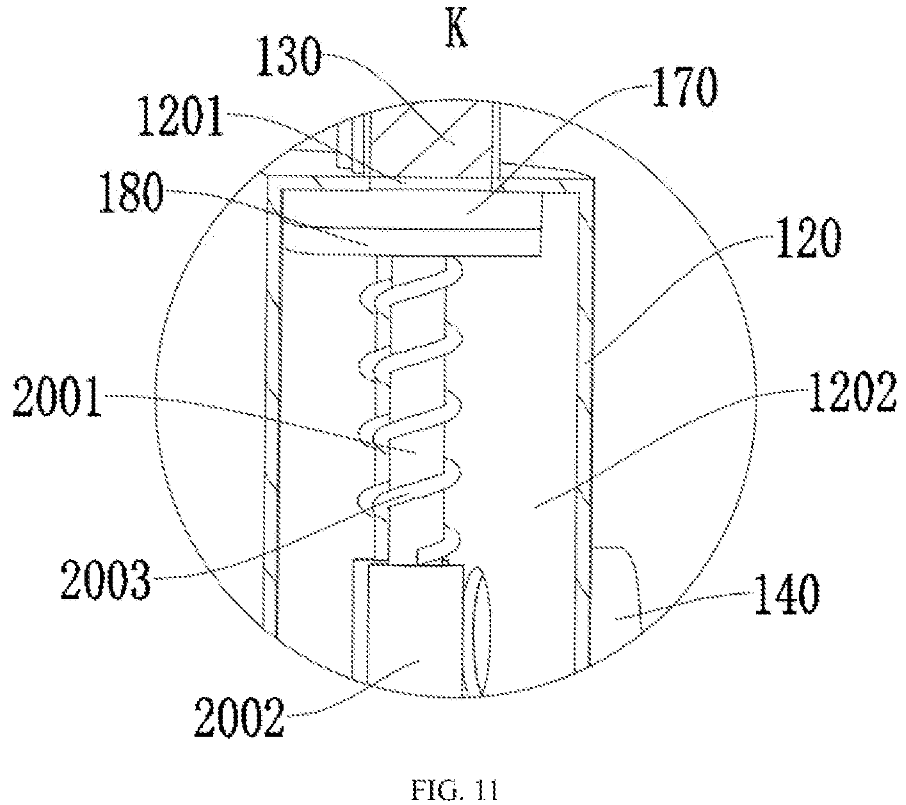
FIG. 11 is an enlarged structural diagram of part K in FIG. 8.
Figure 12:
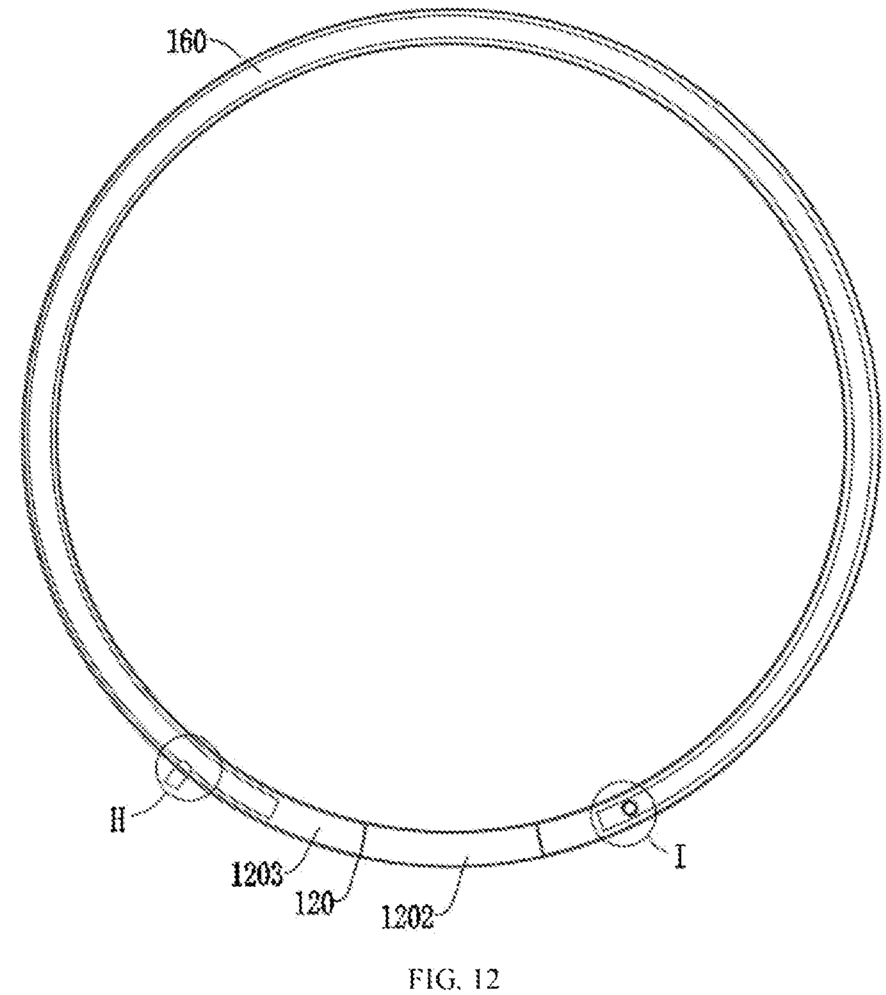
FIG. 12 is a schematic cross-sectional structural diagram of a ring-shaped member connected to a second arc-shaped pipe, a cold air outlet pipe, and a cold air inlet pipe in a top view of an anti-corrosion automatic wrapping device for a bend pipe with a polyethylene composite tape according to an embodiment of the present disclosure.
Figure 13:
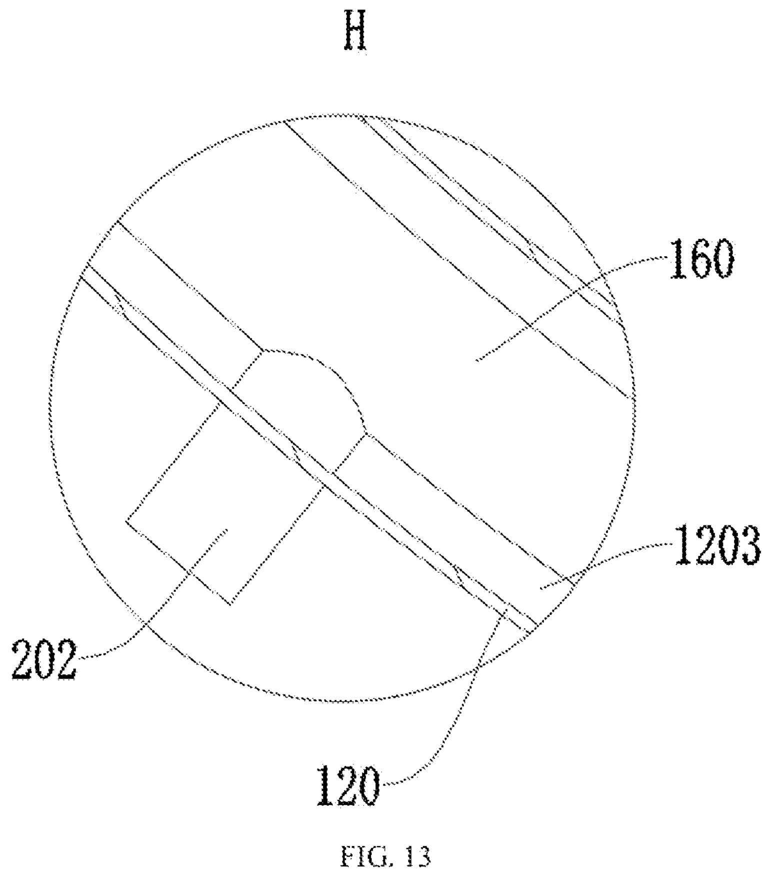
FIG. 13 is an enlarged structural diagram of part H in FIG. 12.
Figure 14:
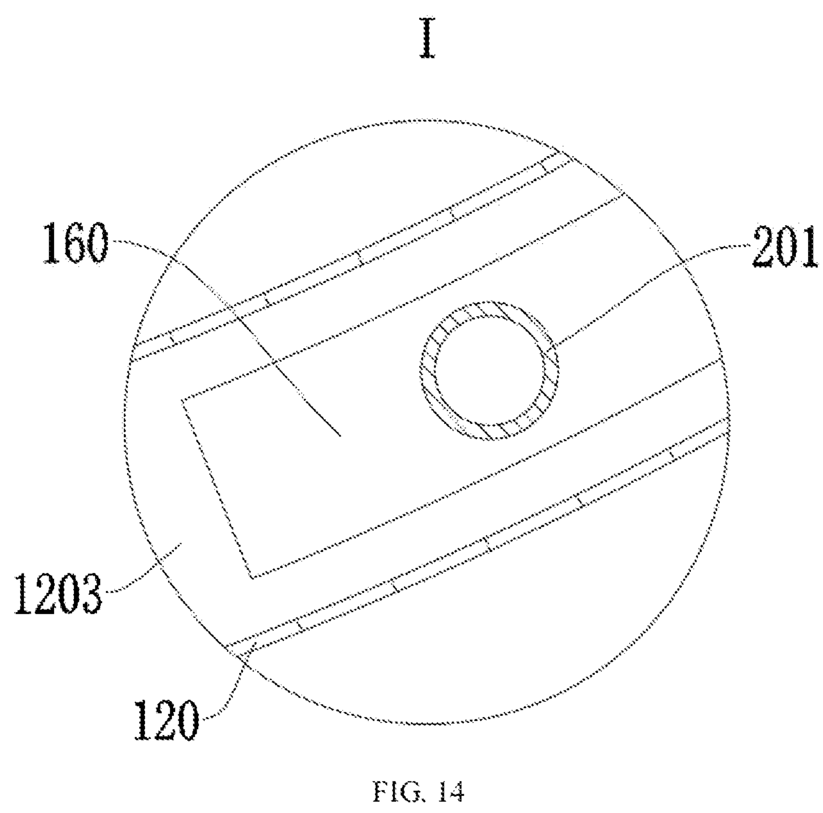
FIG. 14 is an enlarged structural diagram of part I in FIG. 12.
Figure 15:
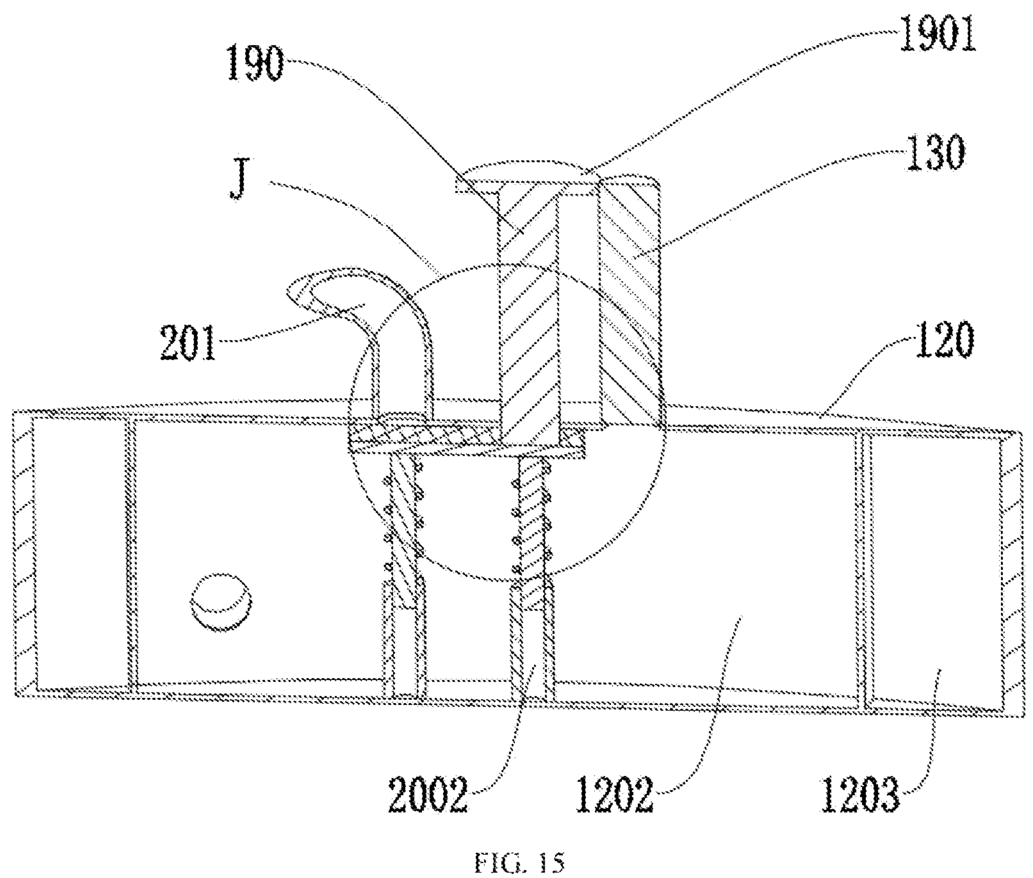
FIG. 15 is a schematic diagram of an axonometric cross-sectional structure of an anti-corrosion automatic wrapping device for a bend pipe with a polyethylene composite tape according to an embodiment of the present disclosure, with a ring-shaped member connected to a locking shaft, a cold air outlet pipe, a drive shaft and an ejection assembly.
Figure 16:
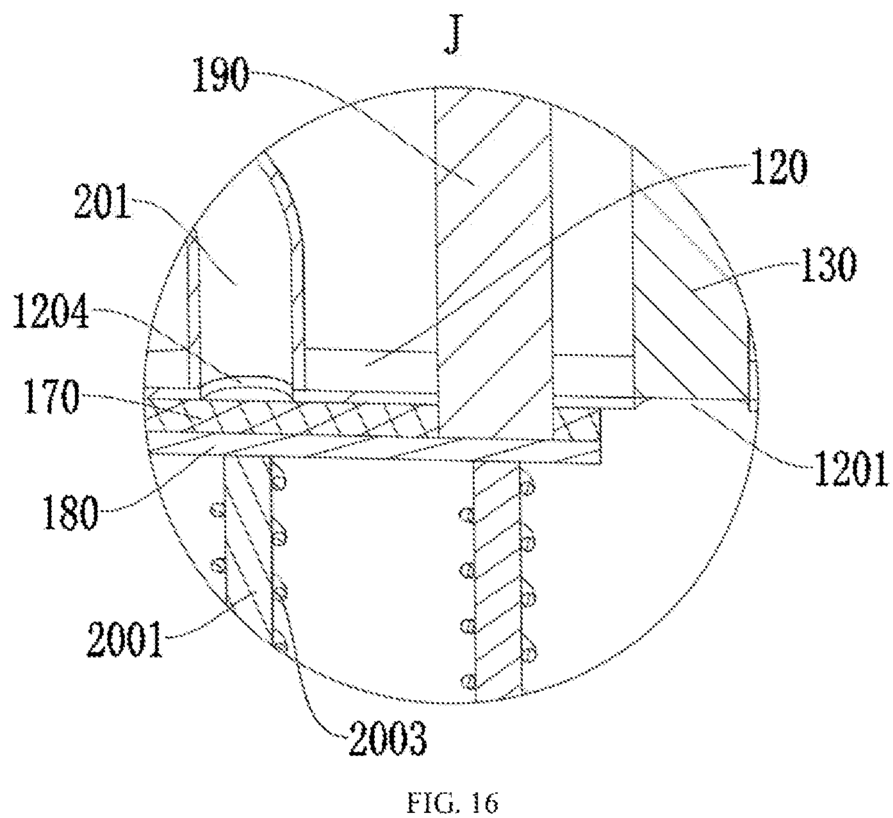
FIG. 16 is an enlarged structural diagram of part J in FIG. 15.
Figure 17:
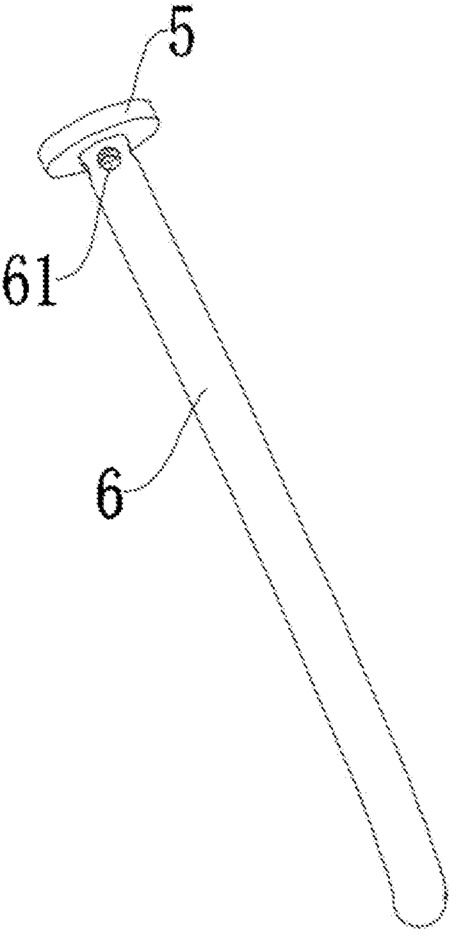
FIG. 17 is a schematic axonometric structural diagram of a sliding block connected to a first arc-shaped pipe in an anti-corrosion automatic wrapping device for a bend pipe with a polyethylene composite tape according to an embodiment of the present disclosure.
Figure 18:
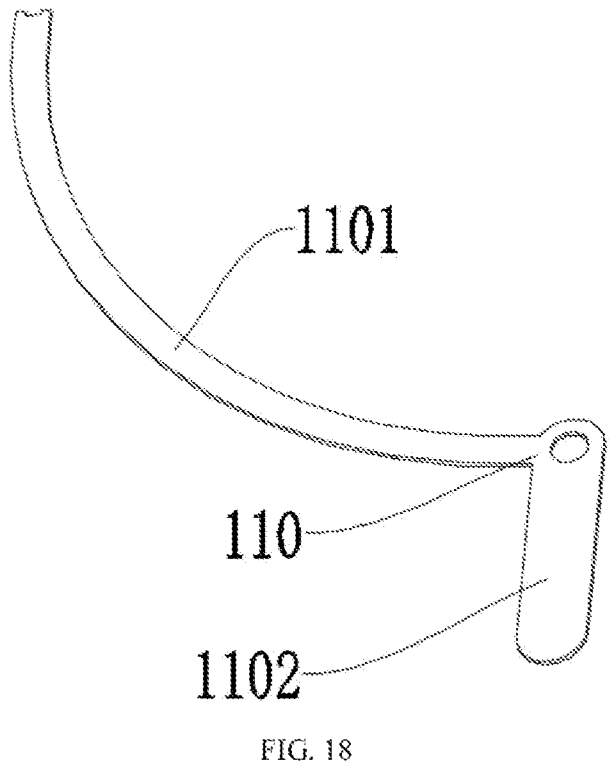
FIG. 18 is a schematic axonometric structural diagram of a connecting plate in an anti-corrosion automatic wrapping device for a bend pipe with a polyethylene composite tape according to an embodiment of the present disclosure.
Figure 19:
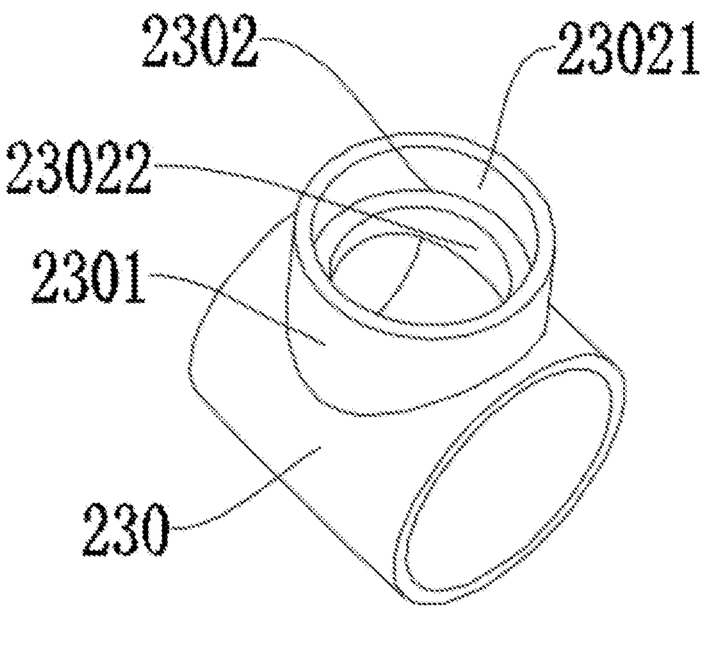
FIG. 19 is a schematic axonometric structural diagram of a sliding connection sleeve in an anti-corrosion automatic wrapping device for a bend pipe with a polyethylene composite tape according to an embodiment of the present disclosure.
Figure 20:
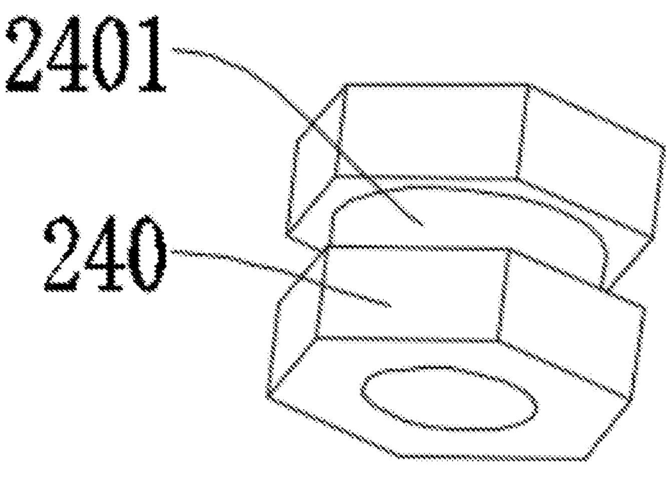
FIG. 20 is a schematic axonometric structural diagram of a drive sleeve in an anti-corrosion automatic wrapping device for a bend pipe with a polyethylene composite tape according to an embodiment of the present disclosure.

In the embodiment, referring to FIGS. 1, 11 and 12, a first arc-shaped cavity 1202 coaxial with the ring-shaped member 120 is provided inside the ring-shaped member 120. The first arc-shaped cavity 1202 is communicated with the locking hole 1201. The anti-corrosion automatic wrapping device for a bend pipe with a polyethylene composite tape also includes a first connecting pipe 140. The first connecting pipe 140 has one end fixed on the outer wall of the ring-shaped member 120 and communicated with the first arc-shaped cavity 1202, and the other end connected to the air inlet of the blower 10. When the blower 10 blows air into the air inlet pipe 9, and also extract air from the first arc-shaped cavity 1202. When the locking shaft 130 and the locking hole 1201 are coaxially aligned, the negative pressure in the first arc-shaped cavity 1202 will make it easier for the locking hole 130 to enter the locking hole 1201.

In some embodiments, referring to FIGS. 1, 3, 12, 13 and 14, 15 and 16, the ring-shaped member 120 is provided therein with a second arc-shaped cavity 1203 coaxial with the ring-shaped member 120. The top surface of the ring-shaped member 120 is provided with a ventilation hole 1204 communicated with the first arc-shaped cavity 1202. The anti-corrosion automatic wrapping device for a bend pipe with a polyethylene composite tape also includes a second connecting pipe 150, a second arc-shaped pipe 160, a sealing gasket 170, a fixed plate 180, a drive shaft 190, a cold air outlet pipe 201, a cold air inlet pipe 202 and two sets of ejection assemblies. The second connecting pipe 150 has one end fixed on the ring-shaped member 120 and communicated with the second arc-shaped cavity 1203, and the other end used to communicate with a water cooler. The second arc-shaped pipe 160 is coaxially inserted into the second arc-shaped cavity 1203, and both ends of the second arc-shaped pipe 160 are closed. The sealing gasket 170 is disposed inside the first arc-shaped cavity 1202 and is adhered to the top wall of the first arc-shaped cavity 1202. The sealing gasket 170 covers the ventilation hole 1204. The fixing plate 180 is disposed inside the first arc-shaped cavity 1202 and below the sealing gasket 170, and the fixing plate 180 is adhered and fixed to the sealing gasket 170. The drive shaft 190 is arranged vertically and slides through the top wall of the first arc-shaped cavity 1202 and the sealing gasket 170. The drive shaft 190 is fixedly connected to the fixed plate 180, and the drive shaft 190 is disposed below the connecting plate 110. One end of the cold air outlet pipe 201 is fixed on the ring-shaped member 120 and connected and communicated with the ventilation hole 1204. The middle portion of the cold air outlet pipe 201 penetrates the top wall of the second arc-shaped cavity 1203. The other end of the cold air outlet pipe 201 is fixed on the second arc-shaped pipe 160 and communicated with the inside of the second arc-shaped pipe 160. The middle portion of the cold air inlet pipe 202 penetrates the outer wall of the second arc-shaped cavity 1203. One end of the cold air inlet pipe 202 disposed inside the second arc-shaped cavity 1203 is fixedly connected to the second arc-shaped pipe 160 and communicates with the inside of the second arc-shaped pipe 160. The two sets of ejection assemblies are disposed in the first arc-shaped cavity 1202 and below the fixed plate 180. The ejection assembly includes an ejection shaft 2001, a fixed pipe 2002 and a compression spring 2003. The ejection shaft 2001 is arranged vertically and is fixedly connected to the fixed plate 180. The fixed pipe 2002 is slidably connected and sleeved on the ejection shaft 2001 and is fixedly disposed on the bottom wall of the first arc-shaped cavity 1202. The compression spring 2003 is sleeved on the ejection shaft 2001 and both ends thereof abut respectively against the fixed plate 180 and the top surface of the fixed pipe 2002. When the locking shaft 130 is coaxially aligned with the locking hole 1201, the locking portion 1102 abuts against the upper surface of the drive shaft 190. The sliding connection between the fixed pipe 2002 and the ejection shaft 2001 enables the fixed plate 180 to slide up and down. The water cooler injects cooling water into the second arc-shaped cavity 1203 through the second connecting pipe 150. The sealing gasket 170 can close the ventilation hole 1204. When the locking shaft 130 is coaxially aligned with the locking hole 1201, the locking shaft 130 slides downward through the locking hole 1201. Since the locking portion 1102 abuts against the upper surface of the drive shaft 190 at this point, the locking portion 1102 will press the drive shaft 190 downward, and the fixed plate 180 will move downward with the sealing gasket 170, thereby opening the ventilation hole 1204. Since the locking shaft 130 penetrates the locking hole 1201, the air outside will enter along the cold air inlet pipe 202, the second arc-shaped pipe 160, the cold air outlet pipe 201, the ventilation hole 1204, the first arc-shaped cavity 1202 and the first connecting pipe 140 into the blower 10. Since the air entering the blower 10 is cooled by the cooling water in the second arc-shaped cavity 1203, the bend pipe 260 can be cooled better. When the locking shaft 130 slides out of the locking hole 1201, the rebound force of the compression spring 2003 can drive the fixing plate 180 to slide to reset.

Further, the top side wall of the drive shaft 190 has an outwardly protruding blocking portion 1901. When the locking shaft 130 abuts against the blocking portion 1901, the locking shaft 130 is aligned with the locking hole 1201.

Figure 5:
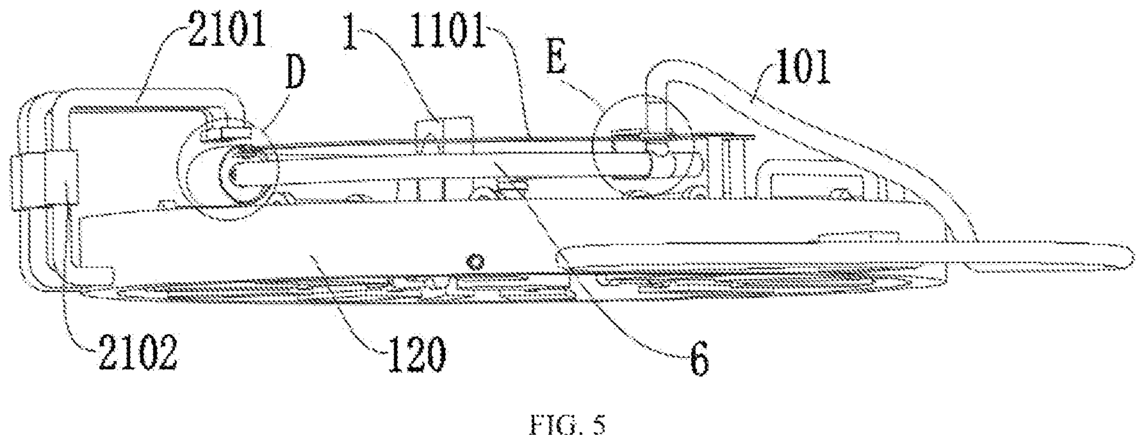
FIG. 5 is a second axonometric structural diagram of an anti-corrosion automatic wrapping device for a bend pipe with a polyethylene composite tape according to an embodiment of the present disclosure.
Figure 6:
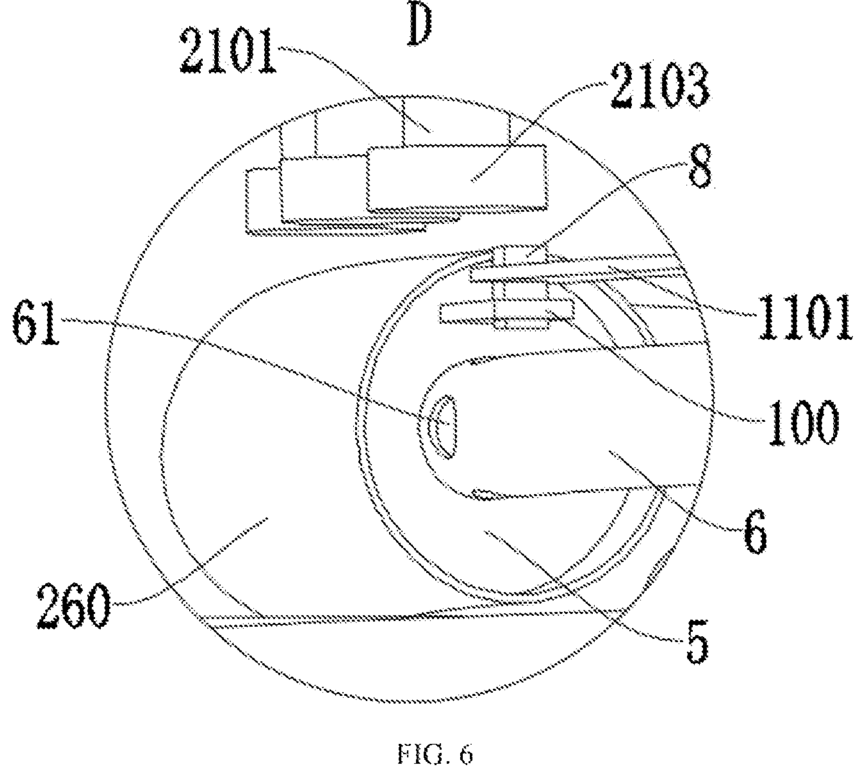
FIG. 6 is an enlarged structural diagram of part D in FIG. 5.
Figure 7:
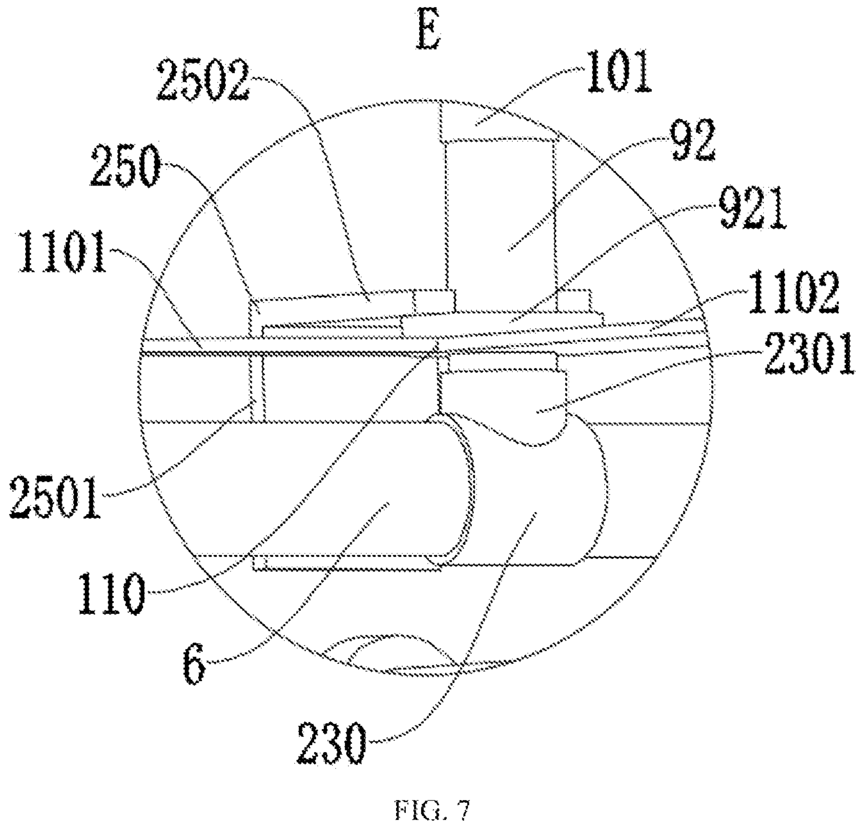
FIG. 7 is an enlarged structural diagram of part E in FIG. 5.

In some embodiments, see FIGS. 5 and 6, the anti-corrosion automatic wrapping device for a bend pipe with a polyethylene composite tape is characterized in that it also includes several sets of sprinkler assemblies, and the sprinkler assembly includes a sprinkler pipe 2101. The sprinkler pipe 2101 has one end fixed on the outer wall of the second arc-shaped cavity 1203 and communicated with the second arc-shaped cavity 1203, and the other end disposed directly above the wrapped bend pipe 260 and having an opening downward. A sprinkler pump 2102 is provided on the sprinkler pipe 2101. A sprinkler head 2103 is disposed on the other end of the sprinkler pipe 2101. The sprinkler pump 2102 extracts the cooling water in the second arc-shaped cavity 1203 through the sprinkler pipe 2101, and sprays to the wrapped bend pipe 260 through the sprinkler head, so that the bend pipe 260 can be better cooled.

Figure 8:
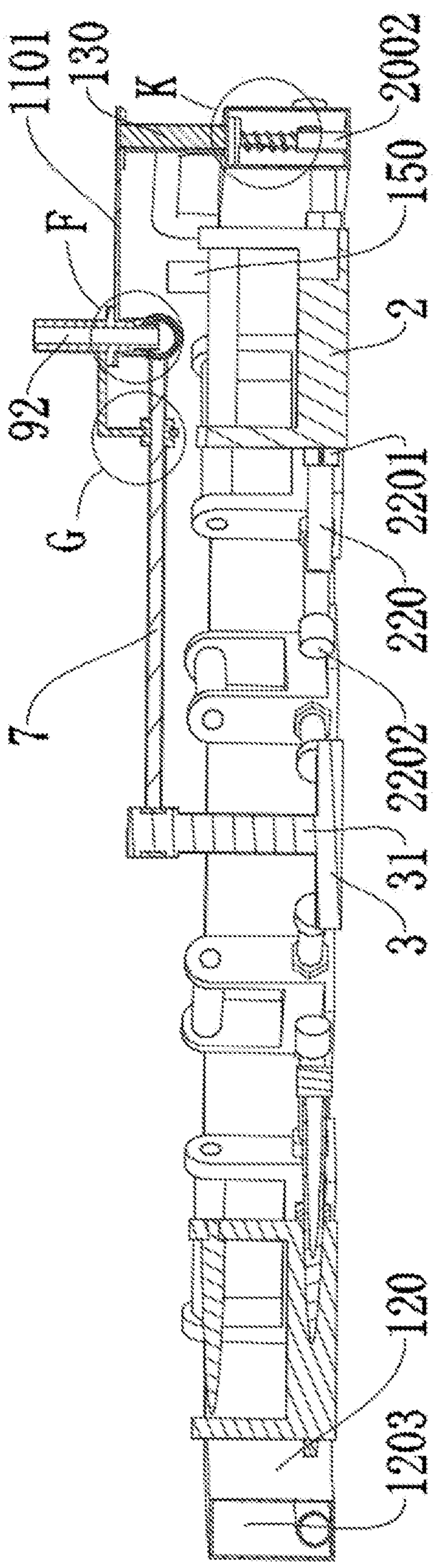
FIG. 8 is a schematic diagram of an axonometric cross-sectional structure of an anti-corrosion automatic wrapping device for a bend pipe with a polyethylene composite tape according to an embodiment of the present disclosure, with a blower and a wrapping machine removed.
Figure 9:
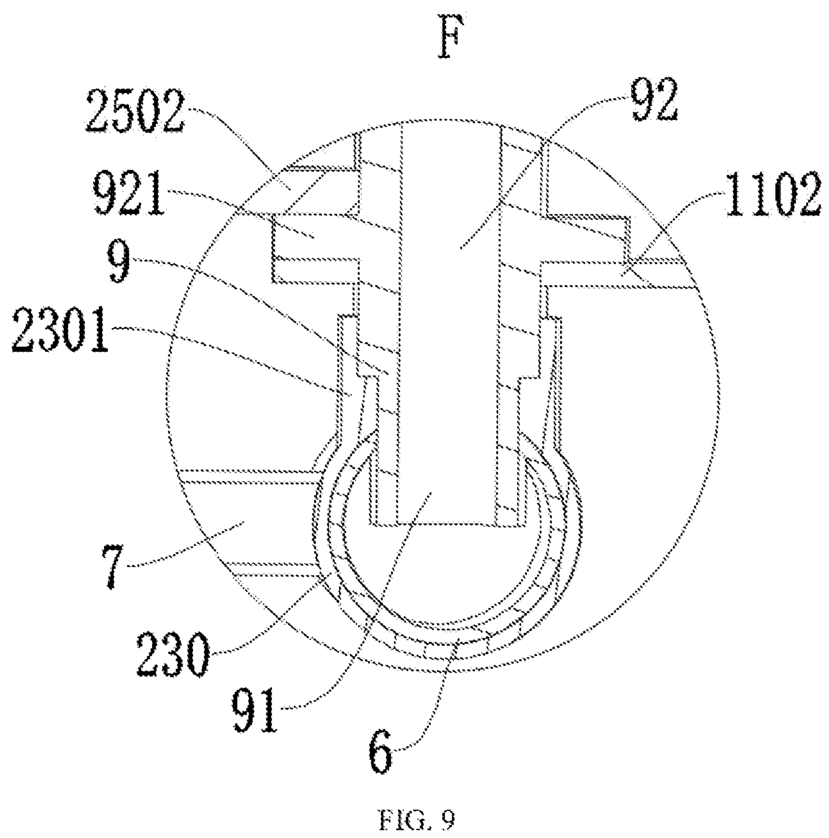
FIG. 9 is an enlarged structural diagram of part F in FIG. 8.
Figure 10:
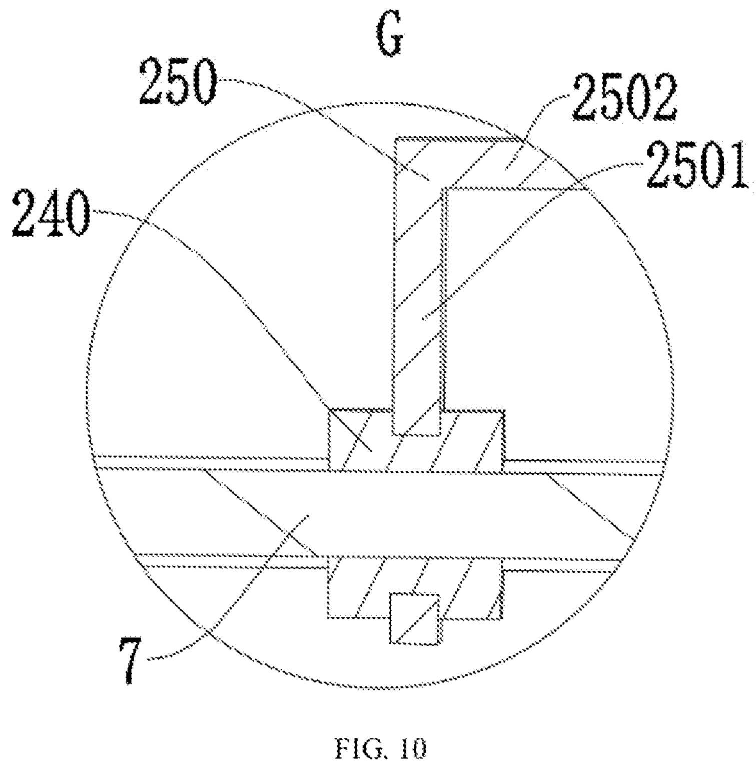
FIG. 10 is an enlarged structural diagram of part G in FIG. 8.

In some embodiments, referring to FIGS. 1 and 8, the anti-corrosion automatic wrapping device for a bend pipe with a polyethylene composite tape also includes a plurality of guide pipes 220. The plurality of guide pipes 220 are in one-to-one correspondence with the plurality of sets of bend pipe conveying structures 2 and are disposed between the ring-shaped member 120 and the limiting shaft 31. The guide pipes 220 are arranged along the radial direction of the limiting shaft 31. One end of the guide pipe 220 is fixedly connected to the ring-shaped member 120 and slides through the corresponding bend pipe conveying structure 2. The outer wall of the guide pipe 220 is provided with a first external thread. The first external thread is threadedly connected to two limit nuts 2201. The two limit nuts 2201 abut against the corresponding bend pipe conveying structure 2 from both sides. When the bending radius of the bend pipe 260 is variant, one of the limit nuts 2201 is driven to disengage from the bend pipe conveying structure 2 according to the bending radius of the bend pipe 260, and then the bend pipe conveying structure 2 is slid to a suitable position, and then the two limit nuts 2201 abut against the bend pipe conveying structure 2, so that the position of the bend pipe conveying structure 2 can be adjusted more accurately.

In some embodiments, see FIG. 1, part of the guide pipe 220 is communicated with the second arc-shaped cavity 1203, and a one-way valve 2202 is provided at one end of the guide pipe 220 communicated with the second arc-shaped cavity 1203 away from the ring-shaped member 120. The water sprayed onto the bend pipe 260 gathers inside the ring-shaped member 120. When the water in the ring-shaped member 120 reaches a preset height, under the action of the sprinkler pump 2102, part of the water in the ring-shaped member 120 passes through the guide pipe 220, is drawn back into the second arc-shaped cavity 1203, thereby preventing the water in the ring-shaped member 120 from exceeding the preset height. The one-way valve 2202 prevents the water in the second arc-shaped cavity 1203 from flowing out along the guide pipe 220.

In some embodiments, referring to FIGS. 5, 7, 8, 9, 10, 19 and 20, the connecting shaft 7 is arranged along the radial direction of the limiting shaft 31 and is provided with a second external thread, and the connecting plate 110 is disposed above the first arc-shaped pipe 6. The air inlet pipe 9 is arranged vertically. The air inlet pipe 9 includes a first section 91 with a smaller outer diameter and a second section 92 with a larger outer diameter. The first section 91 is disposed below the second section 92, the outer wall of the second section 92 has an outwardly protruding abutment portion 921. The anti-corrosion automatic wrapping device for a bend pipe with a polyethylene composite tape also includes a sliding connection sleeve 230, a drive sleeve 240 and an L-shaped plate 250. The sliding connection sleeve 230 is slidably sleeved on the first arc-shaped pipe 6 and is fixedly connected to the connecting shaft 7. The top of the sliding connection sleeve 230 has a protruding portion 2301 protruding upward, and there is a gap between the protruding portion 2301 and the connecting plate 110. The top surface of the protruding portion 2301 is provided with a stepped hole 2302 having a vertical axis line. The first portion 23021 with a larger diameter of the stepped hole 2302 is disposed above the second portion 23022 with a smaller diameter. The first section 91 slidably extends inside the second portion 23022 and slides through the top of the first arc-shaped pipe 6. The second section 92 slides through the locking portion 1102 and the lower end of the second section 92 slidably extends inside the first portion 23021. The abutment portion 921 abuts against the upper surface of the locking portion 1102. The drive sleeve 240 is sleeved on the outside of the connecting shaft 7 and is provided with an internal thread threadedly connected to the second external thread. The outer side wall of the drive sleeve 240 is provided with an annular groove 2401 coaxially arranged with the internal thread. The L-shaped plate 250 includes a vertically arranged vertical portion 2501 and a horizontally arranged horizontal portion 2502. The vertical portion 2501 is rotatably sleeved inside the annular groove 2401, and the horizontal portion 2502 abuts against the upper surface of the abutment portion 921. The stepped hole 2302 can limit the downward movement of the air intake pipe 9, and the horizontal portion 2502 can limit the upward movement of the air intake pipe 9. Driving the drive sleeve 240 to rotate can drive the L-shaped plate 250 to move axially along the connecting shaft 7, so that the horizontal portion 2502 is out of contact with the abutment portion 921, and the air intake pipe 9 can be driven to slide upward and exit the first arc-shaped pipe 6. Then the first arc-shaped pipe 6 can be driven to slide relative to the sliding connection sleeve 230. After the cooling of the bend pipe 260 is completed, the air inlet pipe 9 is driven to slide upward to exit the first arc-shape pipe 6, and then the first arc-shape pipe 6 is driven to slide, so that the sliding block 5 slides out of the bend pipe 260, so that the bend pipe 260 can be removed from the plurality of sets of bend pipe conveying structures 2. The sliding block 5, the blocking member 8, the connecting plate 110, the locking shaft 130, and the connecting member 100 are combined into a limiting assembly. A plurality of limiting assemblies can be provided, and the sizes of the plurality of limiting assemblies are different to correspond to bend pipes 260 of different bending radii and inner diameters. The first arc-shaped pipe 6 is driven to slide out of the sliding connection sleeve 230, and the appropriate limiting assembly can be replaced.

Based on the same disclosed concept, an embodiment of the present application also provides an anti-corrosion automatic wrapping method for a bend pipe with a polyethylene composite tape, using the above-mentioned anti-corrosion automatic wrapping device for a bend pipe with a polyethylene composite tape, including the following steps:

A. Placing a bend pipe 260 on the plurality of sets of bend pipe conveying structures 2, and making the bend pipe 260 and the limiting shaft 31 coaxial;
B. Driving the connecting shaft 7 to rotate with the rotating ring 4 until the sliding block 5 slides into the bend pipe 260 and the blocking member 8 abuts against the end face of the front end of the bend pipe 260 along the movement direction;
C. The plurality of sets of bend pipe conveying structures 2 conveying the bend pipe 260 through the wrapping machine 1.

Due to the use of the above-mentioned anti-corrosion automatic wrapping device for a bend pipe with a polyethylene composite tape, it is possible to avoid the problem that during the process of conveying the bend pipe 260 by the plurality of sets of bend pipe conveying structures 2, the bend pipe 260 is prone to shaking or deviation in its running trajectory.

The above are only preferred embodiments of the present disclosure and are not intended to limit the present disclosure. Any modifications, equivalent substitutions and improvements made within the spirit and principles of the present disclosure shall be included within the protection range of the present disclosure.

What is claimed is:

1. An anti-corrosion automatic wrapping device for a bend pipe with a polyethylene composite tape comprising a wrapping machine and a plurality of sets of bend pipe conveying structures, the device further comprising:

a fixed base fixed on a ground, wherein the fixed base has a vertically arranged limiting shaft, a side wall of the limiting shaft has two outwardly protruding positioning portions, the two positioning portions are arranged at an interval along a vertical direction, the plurality of sets of bend pipe conveying structures are arranged in an annular shape around the limiting shaft, and the wrapping machine is disposed between adjacent two of the bend pipe conveying structures;

a rotating ring rotatably sleeved on the limiting shaft and disposed between the two positioning portions;

a sliding block configured to slidably pass through inside of a bend pipe supported by the plurality of sets of bend pipe conveying structures;

a first arc-shaped pipe coaxially arranged with the limiting shaft and having one end fixedly connected to the sliding block;

a connecting shaft having one end connected to the first arc-shaped pipe, and the other end fixedly connected to the rotating ring; and a blocking member disposed on a same side of the sliding block as the first arc-shaped pipe and connected to the sliding block, wherein when the sliding block slides into the bend pipe, the blocking member is configured to abut against an end face of one end of the bend pipe;

wherein when the bend pipe supported by the plurality of sets of bend pipe conveying structures is conveyed through the wrapping machine, the bend pipe can push the blocking member to move.

2. The anti-corrosion automatic wrapping device for a bend pipe with a polyethylene composite tape according to claim 1, wherein a side wall of one end of the first arc-shaped pipe used to be fixed to the sliding block is provided with a plurality of air outlet holes, and the other end of the first arc-shaped pipe is closed, the anti-corrosion automatic wrapping device of a bend pipe with a polyethylene composite tape further comprises:

an air intake pipe connected to the first arc-shaped pipe and having one end communicated with inside of the first arc-shaped pipe;

a blower, an air outlet of the blower connected to the other end of the air inlet pipe through a hose.

3. The anti-corrosion automatic wrapping device for a bend pipe with a polyethylene composite tape according to claim 2, wherein the blocking member abuts against a top of the bend pipe, and the anti-corrosion automatic wrapping device for a bend pipe with a polyethylene composite tape further comprises:

a connecting member slidably connected and sleeved in the vertical direction outside the blocking member and fixedly connected to the sliding block;

a connecting plate disposed on a same side of the sliding block as the first arc-shaped pipe and above the connecting member, wherein the connecting plate has an arc-shaped portion of an arc-shaped structure and coaxially arranged with the limiting shaft, the arc-shaped portion has one end fixedly connected to the sliding block, and the other end having a locking portion protruding outward along a radial direction of the arc-shaped portion;

a ring-shaped member sleeved outside the plurality of sets of bend pipe conveying structures and coaxially arranged with the limiting shaft, wherein the ring-shaped member is disposed below the connecting plate, and a locking hole is provided on an upper surface of the ring-shaped member;

a locking shaft arranged vertically and fixed on the lower surface of the locking portion, and the locking shaft abutting against the upper surface of the ring-shaped member;

wherein when the wrapped bend pipe continues to move forward, the locking shaft can be coaxially aligned with the locking hole and slide into the locking hole, so that the blocking member can avoid an end face of the bend pipe, thereby enabling the blocking member and the arc-shaped portion to pass into the moving bend pipe.

4. The anti-corrosion automatic wrapping device for a bend pipe with a polyethylene composite tape according to claim 3, wherein a first arc-shaped cavity coaxial with the ring-shaped member is provided inside the ring-shaped member, and the first arc-shaped cavity is communicated with the locking hole, the anti-corrosion automatic wrapping device for a bend pipe with a polyethylene composite tape further comprises:

a first connecting pipe having one end fixed on an outer wall of the ring-shaped member and communicated with the first arc-shaped cavity, and the other end connected to an air inlet of the blower.

5. The anti-corrosion automatic wrapping device for a bend pipe with a polyethylene composite tape according to claim 4, wherein the ring-shaped member is provided therein with a second arc-shaped cavity coaxial with the ring-shaped member, and a top surface of the ring-shaped member is provided with a ventilation hole communicated with the first arc-shaped cavity, and the anti-corrosion automatic wrapping device for a bend pipe with a polyethylene composite tape further comprises:

a second connecting pipe having one end fixed on the ring-shaped member and communicated with the second arc-shaped cavity, and the other end used to communicate with a water cooler;

a second arc-shaped pipe coaxially inserted into the second arc-shaped cavity, and both ends of the second arc-shaped pipe being closed;

a sealing gasket disposed inside the first arc-shaped cavity and adhered to a top wall of the first arc-shaped cavity, the gasket covering the ventilation hole;

a fixed plate disposed inside the first arc-shaped cavity and below the sealing gasket, the fixed plate being adhered and fixed to the sealing gasket;

a drive shaft arranged vertically and sliding through the top wall of the first arc-shaped cavity and the sealing gasket, the drive shaft being fixedly connected to the fixed plate, and the drive shaft being disposed below the connecting plate;

a cold air outlet pipe having one end fixed on the ring-shaped member and connected and communicated with the ventilation hole, a middle portion of the cold air outlet pipe penetrating a top wall of the second arc-shaped cavity, and the other end of the cold air outlet pipe fixed on the second arc-shaped pipe and communicated with inside of the second arc-shaped pipe;

a cold air inlet pipe having a middle portion penetrating an outer wall of the second arc-shaped cavity, one end of the cold air inlet pipe disposed inside the second arc-shaped cavity being fixedly connected to the second arc-shaped pipe and communicated with inside of the second arc-shaped pipe;

two sets of ejection assemblies disposed in the first arc-shaped cavity and below the fixed plate, wherein the ejection assembly comprises an ejection shaft, a fixed pipe and a compression spring, the ejection shaft is arranged vertically and fixedly connected to the fixed plate, the fixed pipe is slidably connected and sleeved on the ejection shaft and fixedly disposed on a bottom wall of the first arc-shaped cavity, the compression spring is sleeved on the ejection shaft, both ends of the compression spring abut respectively against the fixed plate and a top surface of the fixed pipe;

wherein when the locking shaft is coaxially aligned with the locking hole, the locking portion abuts against an upper surface of the drive shaft.

6. The anti-corrosion automatic wrapping device for a bend pipe with a polyethylene composite tape according to claim 5, further comprising a plurality of sets of sprinkler assemblies, and the sprinkler assembly comprises:

a sprinkler pipe having one end fixed on an outer wall of the second arc-shaped cavity and communicated with the second arc-shaped cavity, and the other end disposed directly above the wrapped bend pipe and having an opening facing downward;

a sprinkler pump disposed on the sprinkler pipe;

a sprinkler head disposed on the other end of the sprinkler pipe.

7. The anti-corrosion automatic wrapping device for a bend pipe with a polyethylene composite tape according to claim 6, further comprising:

a plurality of guide pipes in one-to-one correspondence with the plurality of sets of bend pipe conveying structures and disposed between the ring-shaped member and the limiting shaft, wherein the guide pipes are arranged along a radial direction of the limiting shaft, one end of the guide pipe is fixedly connected to the ring-shaped member and slides through the corresponding bend pipe conveying structure, an outer wall of the guide pipe is provided with a first external thread, and the first external thread is threadedly connected to two limit nuts, the two limiting nuts abut against the corresponding bend pipe conveying structure from both sides.

8. The anti-corrosion automatic wrapping device for a bend pipe with a polyethylene composite tape according to claim 7, wherein part of the guide pipe is communicated with the second arc-shaped cavity, and a one-way valve is provided at one end of the guide pipe communicated with the second arc-shaped cavity away from the ring-shaped member.

9. The anti-corrosion automatic wrapping device for a bend pipe with a polyethylene composite tape according to claim 7, wherein the connecting shaft is arranged along a radial direction of the limiting shaft and is provided with a second external thread, and the connecting plate is disposed above the first arc-shaped pipe, the air inlet pipe is arranged vertically, the air inlet pipe comprises a first section with a smaller outer diameter and a second section with a larger outer diameter, the first section is disposed below the second section, an outer side wall of the second section has an outwardly protruding abutment portion, the anti-corrosion automatic wrapping device for a bend pipe with a polyethylene composite tape further comprises:

a sliding connection sleeve slidably sleeved on the first arc-shaped pipe and fixedly connected to the connecting shaft, wherein a top of the sliding connection sleeve has a protruding portion protruding upward, there is a gap between the protruding portion and the connecting plate, a top surface of the protrusion is provided with a stepped hole having a vertical axis line, the first portion with a larger diameter of the stepped hole is disposed above the second portion with a smaller diameter, the first section slidably extends inside the second portion and slides through a top of the first arc-shaped pipe, the second section slides through the locking portion and a lower end of the second section slidably extends inside the first portion, and the abutment portion abuts against an upper surface of the locking portion;

a drive sleeve sleeved on outside of the connecting shaft and provided with an internal thread threadedly connected to the second external thread, and an outer side wall of the drive sleeve provided with an annular groove coaxially arranged with the internal thread;

an L-shaped plate comprising a vertically arranged vertical portion and a horizontally arranged horizontal portion, the vertical portion being rotatably sleeved inside the annular groove, and the horizontal portion abuts against an upper surface of the abutment portion.

10. An anti-corrosion automatic wrapping method for a bend pipe with a polyethylene composite tape, employing the anti-corrosion automatic wrapping device for a bend pipe with a polyethylene composite tape according to claim 1, the method comprising steps of:

A. placing a bend pipe on the plurality of sets of bend pipe conveying structures, and making the bend pipe and the limiting shaft coaxial;

B. driving the connecting shaft to rotate with the rotating ring until the sliding block slides into the bend pipe and the blocking member abuts against an end face of a front end of the bend pipe along a movement direction;

C. conveying, by the plurality of sets of bend pipe conveying structures, the bend pipe through the wrapping machine.

* * * * *